United States Patent

[11] 3,573,593

[72] Inventor Jack Beery
 Farmington, Mich.
[21] Appl. No. 812,005
[22] Filed Apr. 1, 1969
[45] Patented Apr. 6, 1971
[73] Assignee Burroughs Corporation
 Detroit, Mich.

[54] ANGULAR VELOCITY CONTROL SYSTEM FOR STEP SERVO MOTOR SYSTEM RESPONSIVE TO WINDING DEENERGIZATION
6 Claims, 7 Drawing Figs.

[52] U.S. Cl. .................................................. 318/696, 318/345
[51] Int. Cl. .................................................. G05b 19/40
[50] Field of Search .................................................. 318/138, 254, 20, 860, 910, 345; 310/47

[56] References Cited
UNITED STATES PATENTS
3,274,471 9/1966 Moczala .................... 318/138
3,290,572 12/1966 Hartmann et al. ............. 318/138
3,304,481 2/1967 Saussele ....................... 318/138
3,329,852 7/1967 Saussele et al. ............... 318/138
3,374,410 3/1968 Cronquist et al. ............. 318/254X
3,440,506 4/1969 Krestel et al. ................. 318/254X
3,444,447 5/1969 Newell ......................... 318/138

Primary Examiner—G. R. Simmons
Attorneys—Paul W. Fish and Edwin W. Uren

ABSTRACT: The disclosure embodies an electrical system for a bidirectional step servomotor to control the dissipation of counter torque developed by the deenergization of each rotor coil. The amplitude of the induced voltage generated when each rotor coil is deenergized is electrically controlled by a selected one of a plurality of voltage regulators. Each voltage regulator has a different regulating voltage. The larger the amplitude of the induced voltage, the faster the dissipation time of the counter torque, therefore, the higher the angular velocity of the rotor.

FIG.2.

Patented April 6, 1971
3,573,593
3 Sheets-Sheet 1
FIG.1.
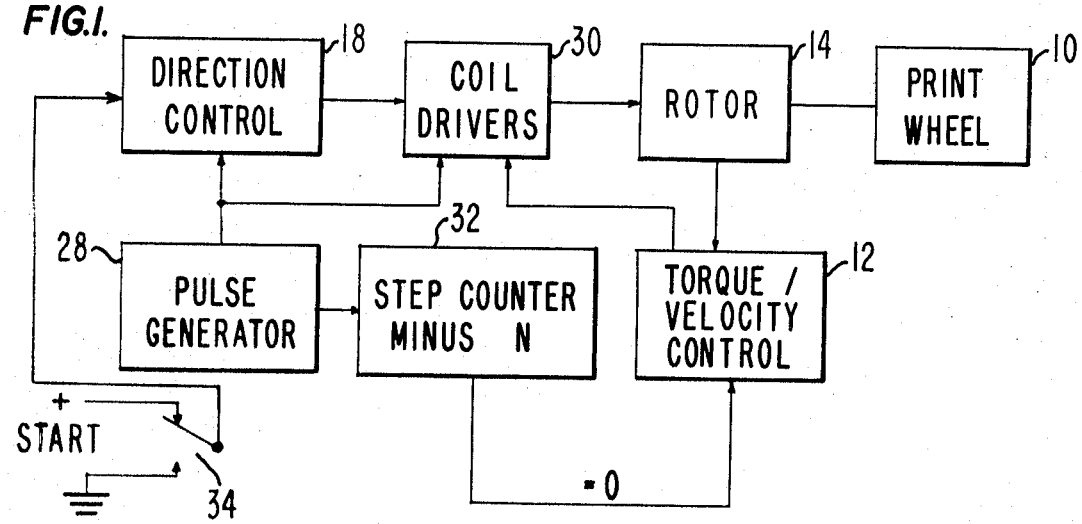
FIG.3.
| CW ROTATION | | |
|---|---|---|
| DAFF | DBFF | COIL |
| 1 | 1 | 15 |
| 1 | 0 | 16 |
| 0 | 0 | 17 |
| 1 | 1 | 15 |
FIG.4.
| CCW ROTATION | | |
|---|---|---|
| DAFF | DBFF | COIL |
| 1 | 1 | 15 |
| 0 | 1 | 17 |
| 1 | 0 | 16 |
| 1 | 1 | 15 |
FIG.5.
PULSE NUMBER
PULSE GENERATOR 28
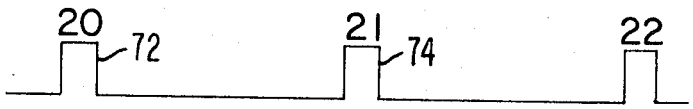
COUNTER 32
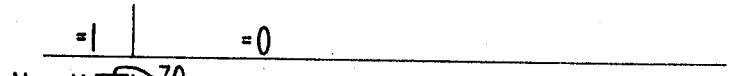
COIL VOLTAGE NO. 17
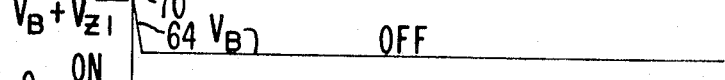
COIL VOLTAGE NO. 15
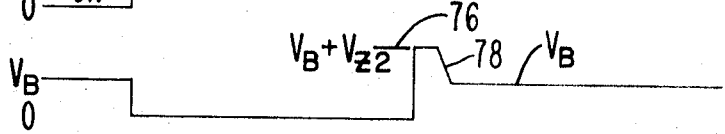
VELOCITY CONTROL
FLIP FLOP
48
INVENTOR.
JACK BEERY.
BY
Russel C. Wells
ATTORNEY.

3,573,593

ANGULAR VELOCITY CONTROL SYSTEM FOR STEP SERVO MOTOR SYSTEM RESPONSIVE TO WINDING DEENERGIZATION

SUMMARY OF THE INVENTION

The invention resides in the provision for the regulation of the angular velocity of the rotor of a bidirectional step servomotor with a velocity control member responsive to the counter torque generated by the deenergization of each of the rotor windings.

DESCRIPTION OF DRAWINGS

In the drawings:

FIG. 1 is a block diagrammatic illustration of a system embodying the present invention;

FIG. 3 is a table showing the coil sequence for clockwise rotation of the rotor of FIG. 1;

FIG. 4 is a table showing the coil sequence for counter-clockwise rotation of the rotor of FIG. 1;

FIG. 5 is a partial timing chart for the system of FIG. 1;

DETAILED DESCRIPTION

Figure 2:
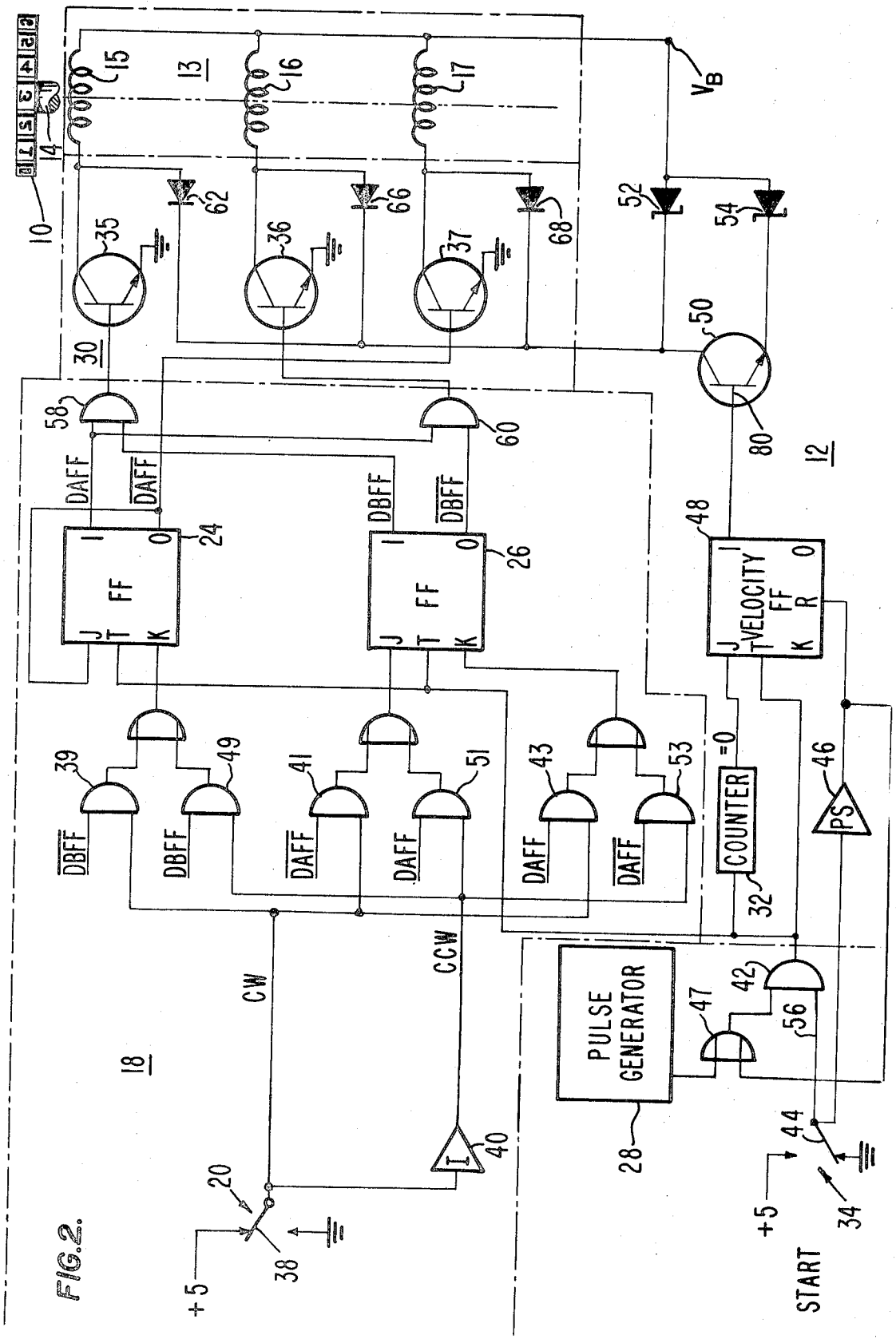
FIG. 2 is a schematic of several of the blocks of the system of FIG. 1.

Referring to FIG. 1, there is illustrated in block diagrammatic form a system for driving a rotatable member 10, such as print wheel, between a present position and a selected position. Incorporated within the system is a torque velocity control unit 12 to select and regulate the rotational velocity of a rotor 14 of a bidirectional stepping motor 13. The velocity control unit 12, which is schematically illustrated in FIG. 2, controls torque developed by a counter electromotive force generated during deenergization of the rotor coils or windings 15, 16 and 17.

The function of the direction control unit 18 of FIG. 1 is to determine and control the direction of rotation of the rotor 14. In FIG. 2, a switch 20, selects the rotational direction of the rotor 14.

Once the direction of rotation is determined, the energization order of the rotor coils 15, 16 and 17 is as shown in FIG. 3 for clockwise rotor rotation or in FIG. 4 for counterclockwise rotor rotation. Each table shows the switching sequence of the two coil driver flip-flops DAFF 24 and DBFF 26 of FIG. 2.

Figure 6:
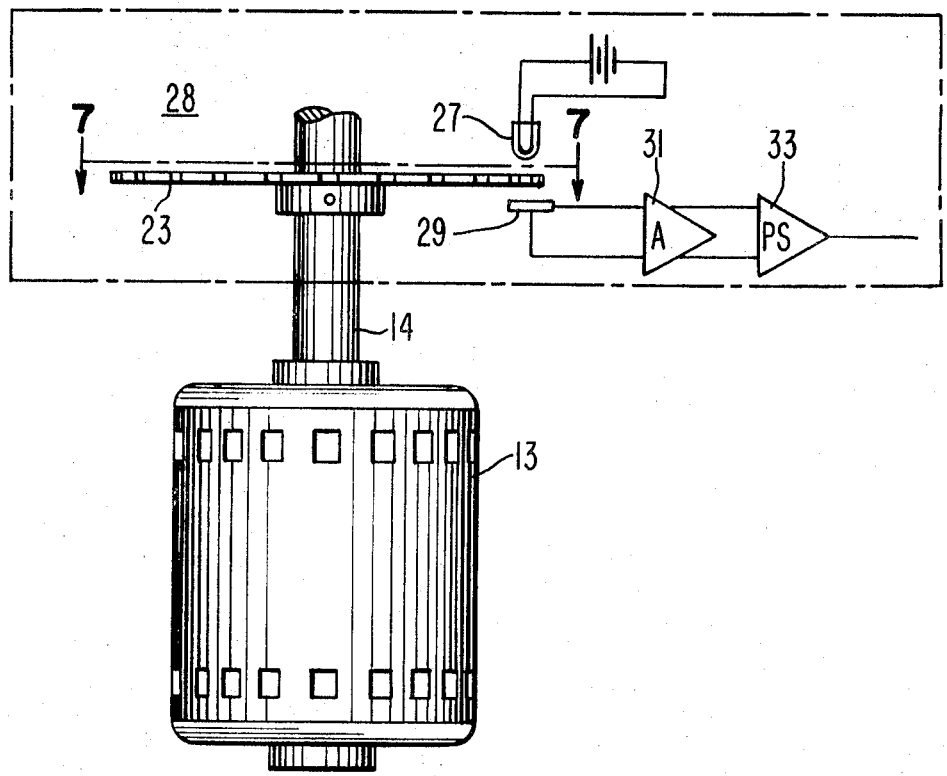
FIG. 6 is an elevation view showing a pulse generator for the system of FIG. 1.
Figure 7:
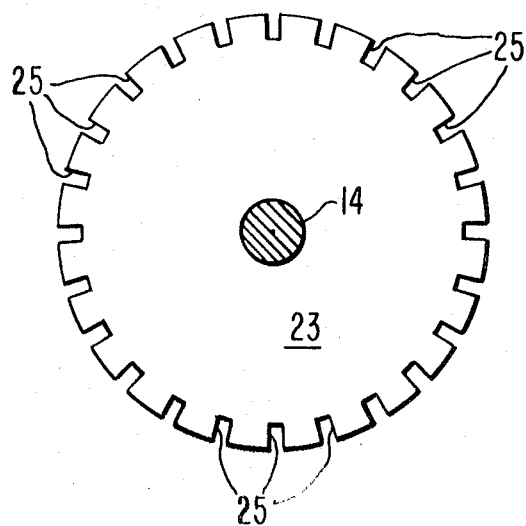
FIG. 7 is a view taken along line 7-7 of FIG. 6.

A pulse generator 28, such as is illustrated in FIG. 6, generates a pulse at each step position of the bidirectional stepping motor 13. The pulse generator 28 comprises a timing disc 23 fixedly attached to the rotor 14 and a solar cell system comprising an excitor lamp 27, a solar cell 29 responsive to the excitor lamp 27, an amplifier 31 and a pulse standardizer 33. The disc 23 which is illustrated in FIG. 7, has a plurality of equally angularly spaced slots 25 around its perimeter each corresponding to an angular step position of the rotor 14.

The excitor lamp 27 and the solar cell 29 are fixedly positioned in a spaced relationship on opposite sides of the disc 23 allowing the slotted portion of the disc 23 to freely rotate therebetween. Thus, when a slot 25 passes between the lamp 27 and the solar cell 29 the cell is illuminated and a voltage signal is generated by the cell 29 and when the solid portion of disc which is circumferentially between the slots 25 passes between the lamp 27 and the cell 29, the cell is dark and no appreciable voltage signal is generated. The voltage signal from the cell 29 is electrically connected to an amplifier 31 to amplify the signal which is then electrically shaped in the pulse standardizer 33. The output of the pulse standardizer 33 is electrically connected to the OR gate 47 in FIG. 2.

The special counter 32, labeled "Step Counter Minus N," hereinafter referred to as counter, is a decrementing counter which is initially set to a number representing the total number of steps between the selected position of the rotor 14 and the present position of the rotor. The number "N" is a number representing the number of steps preceding the selected position. At that step, the angular velocity of the rotor 14 is reduced to insure accurate positioning of the rotor at the selected position. This reduction permits a nonoscillatory detent of the rotor 14 at the selected position step. As illustrated in FIG. 1, the zero output of the counter 32 controls the velocity control unit 12.

OPERATION

The schematic of FIG. 2 is the system of FIG. 1 and in particular shows the preferred embodiment of the velocity control unit 12. This system, in general, rotates the rotor 14 of a bidirectional stepping motor 13 through a large angular displacement at a relatively high uniform angular velocity and at a predetermined number, of steps N, before the selected position or step, the angular velocity of the rotor 14 is reduced to a substantially lower uniform angular velocity. This reduction of angular velocity permits better control of the rotor 14 at the selected step.

The partial timing chart of FIG. 5 shows in graphic form the operation of the velocity control unit 12 according to an example of the preferred embodiment as will be hereinafter explained. The representation of the coil voltage is the voltage waveshape found at the collector of the driver transistors 35, 36, or 37 for that coil during generation of pulses by the generator 28 as illustrated in FIG. 5. FIG. 5 will be used to correlate the electrical operation of the schematic of FIG. 2.

In the schematic of FIG. 2 all of the flip-flops shown are J-–K-type flip-flops. The flip-flops are negative triggering and where the trigger or "T" input is used, the flip-flop is controlled by a pulse on the trigger line. All of the logic gates are positive AND or OR gates. Thus, for an output signal from an AND gate to be true, all of the input signals must be true and likewise, for the output signal from an OR gate to be true, at least one input signal must be true. Also shown are pulse standardizers, labeled PS, which are positive triggered devices for generating a single discrete pulse with each triggered input. In the preferred embodiment, the voltage level for a "true" signal is plus 5 volts and the voltage level for a "false" signal is ground.

The rotational direction of the rotor 14 is selected by the switch 20 which has one end of its switching member 38 at either the true voltage level, plus 5 or at the false voltage level, ground, and the other end is electrically connected to one input of several AND gates 39, 41 and 43 and to the input of the inverter 40. Therefore, when the switch is positioned as shown in FIG. 2, the direction of rotation will be clockwise and the output of the inverter 40 is false inhibiting the AND gates 49, 51 and 53.

The counter 32 is set to a number representing the difference in the number of steps between the present position and "N" is an integer which is determined from the system. Some of the system characteristics to be considered are the moment of inertia of load on the rotor 14 and the operational requirements of the system including the rotational velocity of the load.

For the purposes of illustration, consider the direction of rotation of the rotor to be clockwise, the counter equal to 20, "N" equal to 6 and coil 15 initially energized. According to FIG. 3, the next coil to be energized is coil 16 according the following equation:

*DBFF→DAFF is transferred from the logical false voltage, ground, to the CW·PG1* where PG1 represents the first pulse from the pulse generator AND gate 42.

To actuate the start switch 34, the switch member 44 15 transferred from the logical false voltage, ground, to the logical true voltage, +5. The switch member 44 is electrically connected to the pulse generator AND gate 42 controlling the basic timing of the system and also is electrically connected to the input of the pulse standardizer 46. The output of the pulse standardizer 46 is electrically connected to the dominant reset input, R, of the velocity control flip-flop 48 and to one input of the pulse generator OR gate 47. When the switch member 44 is transferred to the logically true voltage, the pulse standardizer 46 generates a pulse to reset the velocity control flip-flop 48 and provide the first pulse PG1. With the velocity control flip-flop 48 reset, the velocity control switch member or transistor 50 is turned off, thereby connecting a first velocity control member 52 in electrical parallel circuit with the rotor coils 15, 16 and 17. In the preferred embodiment, the second velocity control member 54 is electrically removed from the rotor coil circuit when the transistor 50 is off.

When the start switch 34 is actuated, the switch member 44 also conditions the one input 56 of the pulse generator AND gate 42 true. The output of the pulse generator AND gate 42 is now dependent on the output of the pulse generator 28 and the first pulse output from the AND gate 42 resets DBFF 26 according to the previous equation. Also the first pulse from the AND gate 42 decrements the counter 32 from 20 to 19.

Resetting DBFF 26 causes the output of the first transistor driver AND gate 58, which controls the drive transistor 35 for rotor coil 15, to go false turning off that transistor 35. The second transistor driver AND gate 60 controlling the driver transistor 36 for rotor coil 16 is driven true turning on that transistor 36. When the drive transistor 35 for rotor coil 15 is turned off, the isolation diode 62 electrically connected to coil 15 becomes forward biased by the voltage induced in the coil due to the abrupt change in the flow of current through the coil 15. The waveshape 64 of this induced voltage, more commonly referred to as an inductive kickback voltage is illustrated in FIG. 5. The diode 62 is electrically connected to the first velocity control member 52 or voltage regulator and to the collector of the velocity control transistor 50. With the velocity control flip-flop 48 reset, the first velocity control member 52 is in electrical series with each of the diodes 62, 66, and 68 all three coils and with the supply voltage $V_B$. When the induction kickback voltage reaches the voltage level 70 equivalent to $V_B$ plus the zener voltage $V_{Z1}$ of the velocity control member 52, both the isolation diode 62 and the velocity control member 52 conduct until the voltage falls below this level 70.

The inductive kick voltage generates a torque in the coil which is opposite to the torque generated by the coils when the driver transistor is conducting. This counter torque, which for purposes of illustration in conjunction with FIG. 5, can be measured in units of volt-seconds. Since for each rotor coil, the amount of counter torque is relatively constant for any given electrical condition, the torque can be electrically controlled by controlling the amplitude of the inductive voltage. The higher the amplitude, the faster the dissipation and less effect the counter torque has on the rotor during rotation.

By way of illustration of the previous paragraph in the preferred embodiment, the voltage $V_B$ is plus 28 volts and the zener voltage of the velocity control member 52 is 33 volts. Therefore, the inductive kick reaches a voltage level 70 of approximately 61 volts. Permitting the inductive kick to rise to this voltage level, allows the counter torque to be quickly dissipated. The torque developed by the next coil will not be effectively counteracted by the counter torque developed in coil 17 due to the deenergization of coil 17.

The operation continues until the output of the counter 32 becomes zero. At this time, as illustrated in FIG. 5, coil 17 is energized or on, and coil 15 will become energized according to the following equation:

DAFF→DAFF/.PG20
DBFF→DAFF/.CW20 where:
PG20 is the twentieth pulse 72 from the pulse generator AND gate 42.

The velocity control flip-flop 48 will then set on the next pulse output from the pulse generator AND gate, PG 21, 74 because the counter 32 equals zero. The velocity control transistor 50 conducts to place the second velocity control member 54 in electrical parallel circuit with the first velocity control member 52. In the preferred embodiment, this is also a voltage regulator having a zener voltage of 5 volts. It is a characteristic of voltage regulators connected in parallel circuit to regulate at the lowest voltage of the several regulators, therefore, the inductive voltage will limit at the voltage level 76 equal to $V_B$ plus the zener voltage of the second velocity control member or 33 volts.

Since the electrical conditions for the coils 15, 16 and 17 remain the same in the preferred embodiment, the total amount of energy or counter torque, measured in volt-seconds, to be dissipated also remains constant. Therefore, when the second voltage control member 54 is placed in electrical series with the isolation diodes 62, 66 and 68, the amplitude of the inductive kick voltage is limited at the voltage level 76 of 33 volts increasing the time base of the waveshape 78. The counter torque at this time has a greater effect on the rotor 14 and functions to retard or slow down its angular velocity. This is illustrated in FIG. 5 in the waveshape for coil 15.

In the preferred embodiment, the angular velocity regulated by the first velocity control member 52 is 1470 r.p.m. and the angular velocity regulated by the second velocity control member 54 is 715 r.p.m. However, additional velocity control members such as shown may be added in parallel circuit by the addition of a switch member for each velocity control member. Each additional velocity control member must have a zener voltage electrically smaller than the previous control member. As an example, in the preferred embodiment, the following voltage control members regulated the angular velocity of the rotor 14 as indicated in the following table:

| Velocity control member | Zener voltage | Angular velocity, r.p.m. |
|---|---|---|
| 1 | 33 | 1,470 |
| 3 | 17 | 1,250 |
| 4 | 10 | 925 |
| 2 | 5 | 715 |
| 5 | 0 | 570 |

It is apparent from the above description that if it was desirable to increase the angular velocity of the rotor 14, this can be accomplished by initially having the velocity control transistor 50 in conduction. This will place the first velocity control member 52 in electrical parallel circuit with the second velocity control member 54. The base 80 of the velocity control transistor would be electrically transferred from the "one" output to the "zero" output of the velocity control flip-flop 48. Therefore, initially the angular velocity of the rotor 14 will regulate at 715 r.p.m. and on PG21 the angular velocity will be increased, to 1470 r.p.m.

There has been described angular velocity control system for bidirectional step servomotors wherein the velocity control member is responsive to the counter torque generated by the deenergization of each of the rotor windings. Separate velocity control systems are not required for bidirectional rotation of the rotor as one control system will function to regulate the angular velocity of the rotor regardless of the direction of rotation of the rotor.

I claim:
1. A system to control the angular velocity of the rotor of an electric stepping motor, said system comprising:
   a magnetic rotor;
   a plurality of stator windings equally and angularly spaced about said rotor and electrically connected to a source of voltage;
   a plurality of switch means electrically connected in series circuit respectively with said stator windings, said switch means operable to simultaneously effect the deenergization of a selected one of said stator windings and the energization of an adjacent stator winding causing the rotor to rotate; and a velocity control member electrically connected to said switch means and responsive to the deenergization of each of said stator windings regulating the angular velocity of said rotor.

2. The system to control the angular velocity of the rotor of an electric stepping motor according to claim 1 wherein the velocity control member is a voltage regulator.

3. The system to control the angular velocity of the rotor of an electric stepping motor according to claim 1 further including a switch member connected in electrical parallel circuit with said first-mentioned velocity control member, said switch member normally open, and another velocity control member connected in electrical series circuit with said switch member and in electrical parallel circuit with said first-mentioned velocity control member, said another velocity control member responsive to the deenergization of each of said stator windings when said switch member is closed to regulate the angular velocity of said rotor below that of said first-mentioned velocity control member.

4. A system to control the angular velocity of a step servomotor, said system comprising:
- a magnetic rotor having a plurality of selectable positions;
- a plurality of separately energizable induction coils equally and angularly spaced about the axis of said rotor, said coils consecutively energized to rotate said rotor, one end of each of said coils electrically connected to a source of voltage;
- a coil control member electrically connected to the other end of each of said induction coils selectively controlling the energization of one of said coils and the deenergization of an adjacent coil causing the rotor to rotate;
- an isolation diode having a first end electrically connected to the other end of each of said coils, said diode electrically connected for the conduction of current from said source of voltage and the second ends of said diodes electrically connected together; and
- a velocity control member electrically connected between said second ends of said isolation diodes and the source of power, said velocity control member conductively responsive to the deenergization of said induction coils and operable to control the angular velocity of said rotor.

5. The system to control the angular velocity of a step servomotor according to claim 4 further including a switch member connected in electrical parallel circuit with said first-mentioned velocity control member, said switch member normally open, and another velocity control member connected in electrical series circuit with said switch member and in electrical parallel circuit with said first-mentioned velocity control member, said another velocity control member responsive to the deenergization of each of said coils when said switch member is closed to regulate the angular velocity of said rotor below that of said first-mentioned velocity control member.

6. The system to control the angular velocity of a step servo motor according to claim 5 wherein said first-mentioned velocity control member and said another velocity control member are voltage regulators.

UNITED STATES PATENT OFFICE
CERTIFICATE OF CORRECTION

Patent No. 3,573,593           Dated  April 6, 1971

Inventor(s) Jack Beery

It is certified that error appears in the above-identified patent and that said Letters Patent are hereby corrected as shown below:

Column 2, lines 65-69 should be deleted and the followi inserted instead therefor:

$$DBFF/ \longrightarrow DAFF \cdot CW \cdot PG1$$
where
PG1 represents the first pulse from the pulse generator AND gate 42.
to actuate the start switch 34, the switch member 44 is Column 3, line 67, the equation should appear as shown below:

$$DBFF \longrightarrow DAFF/ \cdot CW \cdot PG20$$

Signed and sealed this 3rd day of August 1971.

(SEAL)
Attest:

EDWARD M. FLETCHER, JR.　　　　　　　　WILLIAM E. SCHUYLER, JI
Attesting Officer　　　　　　　　　　　　Commissioner of Patent: